United States Patent

Baardman et al.

Patent Number: 5,741,939
Date of Patent: Apr. 21, 1998

[54] PROCESS FOR THE COPOLYMERIZATION OF CARBON MONOXIDE WITH AN OLEFINICALLY UNSATURATED COMPOUND

[75] Inventors: Frank Baardman; Arleen Marie Bradford; Jayne Jubb; Pieter Scheerman; Rudolf Jacobus Wijngaarden, all of Amsterdam, Netherlands

[73] Assignee: Shell Oil Company, Houston, Tex.

[21] Appl. No.: 619,868

[22] Filed: Mar. 21, 1996

[30] Foreign Application Priority Data

Mar. 22, 1995 [EP] European Pat. Off. ............ 95200717

[51] Int. Cl.$^6$ ................................................ C07C 45/49
[52] U.S. Cl. .................. 568/387; 568/311; 568/342; 528/392
[58] Field of Search .................... 568/387, 311, 568/342; 528/392

[56] References Cited

U.S. PATENT DOCUMENTS

| | | | |
|---|---|---|---|
| 4,851,582 | 7/1989 | Drent | 568/387 |
| 4,970,294 | 11/1990 | Drent et al. | 528/392 |
| 5,227,465 | 7/1993 | Drent | 528/392 |
| 5,346,873 | 9/1994 | Sommazzi et al. | 568/387 |
| 5,506,338 | 4/1996 | Hanna et al. | 528/392 |
| 5,516,739 | 5/1996 | Barborak et al. | 502/161 |
| 5,525,566 | 6/1996 | Keim et al. | 502/162 |
| 5,658,982 | 8/1997 | Baardman et al. | 528/392 |
| 5,668,249 | 9/1997 | Baardman et al. | 528/392 |
| 5,670,392 | 9/1997 | Somazzi et al. | 528/392 |
| 5,670,611 | 9/1997 | Baardman et al. | 528/392 |

FOREIGN PATENT DOCUMENTS 2185740  7/1987  United Kingdom ............ 568/387

Primary Examiner—James H. Reamer

[57] ABSTRACT

A process for the copolymerization of carbon monoxide with an olefinically unsaturated compound comprising contacting the monomers in the presence of a liquid diluent with a catalyst composition which is based on (a) a source of a Group VIII metal, (b) a bidentate ligand of the general formula $R^1R^2M^1—R—M^2R^3R^4$ wherein $M^1$ and $M^2$ independently represent a phosphorus, arsenic or antimony atom, $R^1$, $R^2$, $R^3$ and $R^4$ independently represent unsubstituted or substituted hydrocarbyl groups on the understanding that at least one of $R^1$, $R^2$, $R^3$ and $R^4$ represents a polar substituted aryl group and R represents a bivalent bridging group containing at least two carbon atoms in the bridge, and (c) a boron hydrocarbyl compound, with application of a stirring power transmitted to the polymerization mixture of at least 0.25 kW/m$^3$.

13 Claims, No Drawings

5,741,939

1

PROCESS FOR THE COPOLYMERIZATION OF CARBON MONOXIDE WITH AN OLEFINICALLY UNSATURATED COMPOUND

FIELD OF THE INVENTION

This invention relates to a process for the copolymerization of carbon monoxide with an olefinically unsaturated compound and to a catalyst composition.

BACKGROUND

EP-A-619335 discloses a process for the copolymerization of carbon monoxide with an olefinically unsaturated compound which comprises contacting the monomers with a catalyst composition based on a Group VIII metal, a ligand and boron hyrocarbyl compound. This process is suitable for preparing linear copolymers of carbon monoxide with an olefinically unsaturated compound. The copolymers are in particular alternating copolymers or, in other words, copolymers in which the monomer units originating in carbon monoxide alternate with the monomer units originating in the olefinically unsaturated compound.

Applicant has experienced that the copolymerization process of EP-A-619335 has a major disadvantage in that it suffers from a rapid decay of the polymerization rate and deactivation of the catalyst. Within an hour the rate of polymerization has been seen to become unattractively low, such that residence times in excess of one hour do not contribute in a meaningful way to the economy of the process.

Applicant has attempted to reverse this situation, for example, by supplying additional Group VIII metal compound during the copolymerization. The results were, however, not satisfactory.

SUMMARY OF THE INVENTION

It has now surprisingly been found that a substantial improvement with respect to the stability of the polymerization rate can be achieved by selecting a specific class of ligands in combination with applying a stirring power above a certain minimum value.

Thus, the present invention relates to a process for the copolymerization of carbon monoxide with an olefinically unsaturated compound comprising contacting the monomers in the presence of a liquid diluent with a catalyst composition which is based on (a) a source of a Group VIII metal, (b) a bidentate ligand of the general formula
$R^1R^2M^1$—R—$M^2R^3R^4$ wherein $M^1$ and $M^2$ independently represent a phosphorus, arsenic or antimony atom, $R^1$, $R^2$, $R^3$ and $R^4$ independently represent unsubstituted or substituted hydrocarbyl groups of the understanding that at least one of $R^1$, $R^2$, $R^3$ and $R^4$ represents a polar substituted aryl group and R represents a bivalent bridging group containing at least two carbon atoms in the bridge, and (c) a boron hydrocarbyl compound, with application of a stirring power transmitted to the polymerization mixture of at least 0.25 kW/m$^3$.

DETAILED DESCRIPTION

Because of the improved stability of the polymerization rate residence times exceeding 1 hour, in particular exceeding 1.5 hours, more in particular exceeding 3 hours, can be applied in a meaningful way. The invented process also

2 allows for the preparation of a larger quantity of copolymer relative to the quantity of Group VIII metal employed. Further, EP-A-619355 recommends to apply a large excess of the boron hydrocarbyl compound over the Group VIII metal, for example such that the molar ratio of boron/Group VIII metal is about 50:1. The present process may advantageously be carried out using a molar ratio of boron/Group VIII metal which is lower than the value recommended in EP-A-619335, for example less than 25:1. Thus, besides being attractive from an economic point of view, the invented process is also attractive in that the quantity of catalyst remnants in the prepared polymer can be lower, which is generally beneficial to polymer properties such as the melt stability.

In the present specification and claims the term "Group VIII metal" encompasses the noble metals ruthenium, rhodium, palladium, osmium, iridium and platinum, and the iron group metals iron, cobalt and nickel.

The catalyst composition suitable for use in the process of the invention is based on a source of cations of the said metal(s). Suitable sources of cations of metals of Group VIII include salts of mineral acids, such as salts of sulphuric acid, nitric acid and phosphoric acid, and salts of sulphonic acid, such as methanesulphonic acid and para-toluenesulphonic acid. Preferred sources are salts of carboxylic acids, in particular those having up to 6 carbon atoms, such as acetic acid, propionic acid and trifluoroacetic acid. If desired, as cation source use may be made of the metals in their elemental form, or in a zero-valent state thereof, e.g. in complex form, such as complexes wherein the Group VIII metal is covalently bonded to one or two hydrocarbyl groups. These covalently bonded hydrocarbyl groups may be aliphatic or aromatic and contain typically up to 12 carbon atoms. Preferred covalently bonded hydrocarbyl groups are aliphatic groups, in particular n-alkyl groups, such as methyl and n-butyl groups.

Catalyst compositions based on a noble Group VIII metal are preferred, those based on palladium being most preferred. A preferred source of palladium is palladium (II) acetate.

In addition to a Group VIII metal the catalyst composition contains a boron hydrocarbyl compound. The boron hydrocarbyl compound is typically a hydrocarbylborane of the general formula BXYZ wherein X, Y and Z denote independently a substituted or unsubstituted hydrocarbyl group, a hyroxy group, a substituted or unsubstituted hydrocarbyloxy group or a halogen atom, on the understanding that at least one of X, Y and Z denotes a substituted or unsubstituted hydrocarbyl group. The said hydrocarbyl groups and the hydrocarbyl groups of the hydrocarbyloxy groups may be aliphatic or aromatic groups, such groups typically having up to 12 carbon atoms. Preferred hydrocarbyl groups are aryl groups which may or may not be substituted. Preferred substituent of the hydrocarbyl groups are electron withdrawing groups or atoms, such as trihalomethyl groups, nitro groups and halogen atoms. Hydrocarbyl group of which all hydrogen atoms are replaced by substituents are included in the term "hydrocarbyl group". The hydrocarbyl groups are in particular phenyl groups, more particularly perfluorophenyl or 3,5-bis(trifluoromethyl)phenyl groups. Examples of suitable aliphatic groups are ethyl, n-butyl and n-hexyl groups. Halogen atoms X, Y or Z are preferably fluorine. Examples of hydrocarbylboranes are phenyldifluoroborane, phenylboronic acid and hexylboronic acid. It is preferred that all three groups X, Y and Z are hydrocarbyl groups. Preferred hydrocarbylboranes are triphenylborane, tris(perfluorophenyl)borane and tris[3,5-bis(trifluoromethyl)phenyl]borane.

Other suitable boron hydrocarbyl compounds are salts containing one or more hydrocarbylborate anions per molecule, such as salts of the general formula MeBZ$^1$Z$^2$Z$^3$Z$^4$ wherein Me is an alkali metal, for example lithium or sodium, and Z$^1$, Z$^2$, Z$^3$ and Z$^4$ denote independently a substituted or unsubstituted hydrocarbyl group. The hydrocarbyl groups Z$^1$, Z$^2$, Z$^3$ and Z$^4$ may be of the same types and may be selected according to the same preferences as indicated above for the groups X, Y and Z. Examples are lithium tetraphenylborate and sodium tetrakis (perfluorophenyl)borate.

The quantity of boron hydrocarbyl compound may be varied between wide limits. However, as indicated hereinbefore, it is a particular feature of this invention that the boron hydrocarbyl compound may be used in a quantity such that the molar ratio of boron to the Group VIII metal is less than 25. More in particular this ratio is in the range of 0.1–20, preferably in the range of 0.5–15, more preferably in the range of 1–10.

It is advantageous to supply a part of the boron hydrocarbyl compound during the polymerization in order to gain a further improvement in maintaining the polymerization rate at the initial level. For example, 40% or less, preferably 5–30%, of the boron hydrocarbyl compound is supplied at the start of the polymerization and the remainder is supplied in a later stage, prior to work-up, in a continuous fashion or stepwise.

The catalyst composition of the invented process is further based on a bidentate ligand of the general formula

R$^1$R$^2$M$^1$—R—M$^2$R$^3$R$^4$  (I)

with M$^1$, M$^2$, R$^1$, R$^2$, R$^3$, R$^4$ and R as defined hereinbefore.

In the ligands of formula (I) M$^1$ and M$^2$ preferably represent phosphorus atoms. R$^1$, R$^2$, R$^3$ and R$^4$ may independently represent optionally polar substituted alkyl, aryl, alkaryl, aralkyl or cycloalkyl groups, on the understanding that at least one of R$^1$, R$^2$, R$^3$ and R$^4$ represents an aryl group which is polar substituted.

Suitable polar groups include halogen atoms, such as fluorine and chlorine, alkoxy groups such as methoxy and ethoxy groups and alkylamino groups such as methylamino-, dimethylamino- and diethylamino groups. Alkoxy groups and alkylamino groups contain in particular up to 5 carbon atoms in each of their alkyl groups.

It is preferred that each of R$^1$, R$^2$, R$^3$ and R$^4$ represents an aryl group, typically a phenyl group, substituted at an ortho position with respect to M$^1$ or M$^2$, with a polar group, in particular an alkoxy group, especially a methoxy group.

In the ligands of formula (I), R preferably represents a bivalent organic bridging group containing from 2 to 4 bridging atoms, at least two of which are carbon atoms. Examples of such groups R are —CH$_2$—CH$_2$—, —CH$_2$—CH$_2$—CH$_2$—, and —CH$_2$—CH$_2$—CH$_2$—CH$_2$—. Preferably R is a trimethylene group. Preferred ligands are 1,3-bis-[bis(2,4-dimethoxyphenyl)phosphino]propane, 1,3-bis [bis-(2,4,6-trimethoxyphenyl)phosphino]propane and, more preferred, 1,3-bis[bis(2-methoxyphenyl)phosphino] propane.

It is preferred to have in the ligand incorporated a bridging group which consists of three and a the bridge of which the middle atom is a carbon or silicon atom which carries one or two substituents containing carbon, hydrogen and optionally oxygen, and the two outer bridging atoms are carbon atoms, typically the carbon atoms of methylene groups (—CH$_2$—). The use of such ligands, which thus have a branched bridging group, is advantageous because it provides a further improvement in maintaining the polymerization rate at the initial level.

Accordingly, the present invention also relates to a catalyst composition which is based on (a) a source of a Group VIII metal, (b) a bidentate ligand of the general formula R$^1$R$^2$M$^1$—R—M$^2$R$^3$R$^4$ wherein M$^1$ and M$^2$ independently represent a phosphorus, arsenic or antimony atom, R$^1$, R$^2$, R$^3$ and R$^4$ independently represent unsubstituted or substituted hydrocarbyl groups on the understanding that at least one of R$^1$, R$^2$, R$^3$ and R$^4$ represents a polar substituted aryl group and R represents a bivalent ridging group which consists of three atoms in the bridge of which the middle atom is a carbon or silicon atom which carries one or two substituents containing carbon, hydrogen and optionally oxygen, and the two outer bridging atoms are carbon atoms, and (c) a boron hydrocarbyl compound.

The substituents which may be attached to the middle atom of the branched bridging group may be, for example, aliphatic or aromatic hydrocarbyl groups and they may contain ether linkages, such as is alkoxyalkyl groups. They have typically up to 15 carbon atoms, more typically up to 10 carbon atoms. If the middle atom carries two substituents these subitituents may suitably be connected to one another by an additional link, i.e. other than by the middle atom of the bridge, so that they form together with that middle atom a ring structure. For example, such a situation represents itself when the substituents together form a —CH$_2$—CH$_2$—CH$_2$—CH$_2$— group or a —CH$_2$—O—C(CH$_3$)$_2$—O—CH$_2$— group.

If the middle atom of the branched bridging group is a carbon atom this carbon atom is typically substituted with the following group(s):

a hydroxy group and an alkyl group such as a methyl group, or two alkyl groups, preferably identical alkyl groups, such as methyl groups, or a single group selected from aryl groups, such as the phenyl group, aralkyl groups such as the benzyl group, alkyl groups such as the propyl group, aralkyloxy groups such as the benzyl group or the 2,4,6-trimethylbenzyloxy group, alkoxyalkoxy groups such as the methoxyethoxy group, and hydroxyalkyl groups such as the 6-hydroxyhexyl group.

If the middle atom of the branched bridging group is a silicon atom it is typically substituted with two alkyl groups, preferably identical alkyl groups, such as methyl groups.

Particularly preferred ligands are 2-hydroxy-2-methyl-1, 3-bis[bis(2-methoxyphenyl)phosphino]propane, 2,2-dimethyl-1,3-bis(2-methoxyphenyl, phenylphosphino) propane, 2,2-dimethyl-1,3-bis[bis(2-methoxyphenyl) phosphino ]propane, 2-phenyl-1,3-bis[bis(2-methoxyphenyl)phosphino]propane, 2-benzyl-1,3-bis[bis(2-methoxyphenyl)phosphino]propane, 2-propyl-1,3-bis[bis(2-methoxyphenyl)phosphino]propane, 2-benzyloxy-1,3-bis [bis(2-methoxyphenyl)phosphino]propane, 2-(2,4,6-trimethylbenzyloxy)-1,3-bis[bis(2-methoxyphenyl) phosphino]propane, 2-ethoxymethoxy-1,3-bis[bis(2-methoxyphenyl)phosphino]propane. The ligands mentioned here are known from EP-A-300583, EP-A-296687, EP-A-454270 and EP-A-585493.

The amount of bidentate ligand supplied may vary considerably, but is usually dependent on the amount of metal of Group VIII, present in the catalyst composition. Preferred amounts of bidentate ligands are in the range of 0.5 to 8, preferably in the range of 0.5 to 2 moles per gram atom of metal of Group VIII.

The performance of the catalyst composition may be improved by incorporating therein an organic oxidant promoter, such as a quinone. Preferred promoters are selected from the group consisting of benzoquinone, naphthoquinone and anthraquinone. The amount of promoter is advantageously in the range of 1–50, preferably in the range of 1 to 10 mole per gram atom of metal of Group VIII.

The amount of catalyst used in the process of the invention may vary between wide limits. As indicated hereinbefore it is advantageous to employ the least quantity of catalyst composition as possible in relation to the quantity of copolymer to be prepared. Recommended quantities of catalyst composition are in the range of $10^{-8}$ to $10^{-2}$, calculated as gram atoms of metal of Group VIII per mole of olefinically unsaturated compound to be copolymerized with carbon monoxide. Preferred quantities are in the range of $10^{-7}$ to $10^{-3}$ on the same basis.

It is advantageous to carry out the copolymerization process in the presence of a protic compound. An advantage of using a protic compound resides in further maintaining the polymerization rate at the initial level. Examples of protic compound are acids (such as sulphonic acids, carboxylic acids and adduces of boric acid and glycols or salicylic acids), alcohols and water. They have typically 15 or fewer carbon atoms, if any. Preferred acids are those having a pKa of less than 6, more preferably less than 4 and in particular less than 2, when measured in aqueous solution at 18° C. Preferred protic compounds are alcohols, such as primary, secondary and tertiary aliphatic alcohols and phenols. They may be mono-alcohols or polyols, such as glycols. Preferred alcohols are the lower alcohols, normally understood to be the mono-alcohols which are completely miscible with water, in particular methanol and ethanol. The quantity of the protic compound employed may vary between wide ranges. Eligible quantities of the acids are in the range of 0.5–200, in particular in the range of 1.0 to 50, more in particular in the range of 1.0–10 equivalents per gram atom of Group VIII metal. When the protic compound is an alcohol, in particular a lower alcohol, it may function in the copolymerization as the liquid diluent or it may be incorporated therein, for example in a quantity up to 50% by volume, in particular 5–30% by volume, relative to the total volume of the diluent.

Olefinically unsaturated compounds which can be used as monomers in the copolymerization process of the invention, include compounds consisting exclusively of carbon and hydrogen and compounds which in addition comprise hetero atoms, such as unsaturated esters. Unsaturated hydrocarbons are preferred. Examples of suitable monomers are lower α-olefins, i.e. olefins containing from 2 to 6 carbon atoms, such as ethene, propene and butene-1, cyclic olefins such as cyclopentene, aromatic compounds, such as styrene and alpha-methylstyrene and vinyl esters, such as vinyl acetate and vinyl propionate. Preference is given to ethene and mixtures of ethene with another α-olefin, such as propene or butene-1.

Generally, the molar ratio of on the one hand carbon monoxide and on the other hand the olefinically unsaturated compound(s) is selected in the range of 1:10 to 5:1. Preferably the molar ratio is in the range of 1:5 to 2:1, substantially equimolar ratios being preferred most.

The copolymerization process of this invention is carried out in the presence of a liquid diluent. Preferably a diluent is used in which the copolymer to be prepared forms a suspension, in which case a diluent may be selected in which the copolymer is insoluble or virtually insoluble. Examples of liquid diluents are ketones (e.g. acetone), chlorinated hydrocarbons (e.g. chloroform or dichloromethane), aromatics (e.g. toluene, benzene, chlorobenzene) and protic diluents, such as the lower alcohols (e.g. methanol and ethanol). Mixtures of liquid diluents may be used as well, for example protic diluents may comprise aprotic compounds. Particularly preferred are aromatic diluents and protic diluents because these provide a further improvement in maintaining the polymerization rate at the initial level.

When the process of this invention is carried out such that the prepared copolymer is formed as a suspension in the liquid diluent it is advantageous to have a solid particulate material suspended in the diluent before the monomers are contacted with the catalyst composition. This embodiment of the process is advantageous in that it provides a further improvement in maintaining the polymerization rate at the initial level. In this embodiment the catalyst is preferably used as a solution in the diluent. Alternatively it may be advantageous that a catalyst is used which is deposited on the solid particulate material or, otherwise, which is chemically bound to the solid particulate material. Catalysts of the latter type are known in the art, for example from EP-A-511713, EP-A-404228 and EP-A-619334.

Typically a copolymer of carbon monoxide and an olefinically unsaturated compound is used as the solid particulate material, in particular a copolymer which is based on the same monomers as the copolymer to be prepared. The latter means that, for example, when a linear alternating copolymer of carbon monoxide and ethene will be prepared a linear alternating copolymer of carbon monoxide and ethene from an earlier polymer preparation will be suspended in the diluent. Other suitable solid particulate materials may be inorganic or organic materials, such as silica, alumina, talc, soot and polymers, for example polyethene, polypropene and polystyrene.

The solid particulate material is suitably used in a quantity of 0.1–20 % w, relative to the weight of the diluent, more suitably in a quantity of 0.5–10 % w. The bulk density of the solid particulate material is typically in the range of 50–1000 kg/m$^3$, in particular in the range of 100–500 kg/m$^3$. The solid particulate material has typically an average particle size of $10^{-6}$–$10^{-3}$ m, in particular $10^{-6}$–$5\times10^{-4}$ m. The average particle size is determined as follows. With the aid of a commercially available particle size analyser, a cumulative weight distribution of a representative sample of the solid particulate material is determined as a function of the particle size. The cumulative weight distribution function is converted into a cumulative surface area distribution function, as described by Terence Allen in Particle Size Measurement (Chapman and Hall, London, 1981), p. 122 ff. The average particle size is found as the median of the cumulative surface area distribution function.

The copolymerization process of this invention is carried out with the application of a stirring power transmitted to the polymerization mixture of at least 0.25 kW/m$^3$, in particular at least 0.5 kW/m$^3$. When the stirring power applied is less than 0.25 kW/m$^3$ there is a depletion of monomer, in particular of carbon monoxide, in the liquid phase which causes a decay of the rate of copolymerization. A stirring power of at least 0.25 kW/m$^3$ improves this situation. When a diluent is used in which the copolymer to be prepared forms a suspension it is advantageous to apply a stirring power of at least 0.5 kW/m$^3$, in particular at least 1.0 kW/m$^3$. A practicable maximum of the power density is 20 kW/m$^3$. A preferred range of the power density is from 1.5 to 15 kW/m$^3$. The stirring power may be transmitted to the polymerization mixture by any suitable means, for example, a stirring device, a jet mixer or a gas stream.

The copolymerization process is usually carried out at a temperature in the range of 20° to 200° C., preferably at a temperature in the range of 30° to 150° C. The reaction is conveniently performed at a pressure in the range of 2 to 200 bar, pressures in the range of 20 to 100 bar being preferred. The process is typically carried out at a scale at which the quantity of liquid diluent exceeds 10 kg. The process may be carried out as a batch process or as a continuous process. In the latter case it is advantageous to apply two or more reactors connected in series, because this increases the quantity of polymer which can be prepared within a given period of time using a certain reaction volume and a certain quantity of catalyst.

The copolymers obtained according to the invention are suitable as thermoplastics for fibres, films or sheets, or for injection moulding, compression moulding and blowing applications. They may be used for applications in the car industry, for the manufacture of packaging materials for food and drinks and for various uses in the domestic sphere.

The invention will be illustrated by the following examples. The diluents were analytical grade chemicals, which were used as purchased.

EXAMPLE 1

(For Comparison)

A copolymer of carbon monoxide with ethene and propene was prepared as follows.

Tris(perfluorophenyl)borane (0.247 g, 0.48 mmoles) was weighed in air into a dried Schlenk tube and dissolved in 100 ml dichloromethane. The solution was transferred to a 300 ml autoclave equipped with baffles and an inclined blade stirrer. Subsequently 25 g propene was added. The autoclave was pressurised to 30 bar with premixed carbon monoxide and ethene (1:1 molar ratio). The stirring power applied was about 3 kW/m$^3$. The autoclave was heated to 70° C. L$_2$Pd (CH$_3$CO$_2$)$_2$ (0.0154 g, 0.025 mmoles), wherein L$_2$ denotes 1,3-bis(diphenylphosphino)propane, taken up in 10 ml dichloromethane was injected into the autoclave. The autoclave was pressurised with the carbon monoxide/ethene mixture to 50 bar and maintained at that pressure for 1 hour by supplying additional carbon monoxide/ethene mixture. The pressure was released and the autoclave was allowed to cool to room temperature.

The polymer product was recovered by filtration, washed with dichloromethane and dried.

Polymerization rates were calculated from the rate of addition of the carbon monoxide/ethene mixture. The initial polymerization rate was 10.7 kg copolymer/(g palladium.hour); the rate after 1 hour, i.e. prior to the release of pressure, was 1.0 kg copolymer/(g palladium.hour). Thus, the rate decay was 90%.

EXAMPLE 2

A copolymer of carbon monoxide with ethene and propene was prepared following the procedures outlined in Example 1, but with 0.025 mmoles L$_2$Pd(CH$_3$CO$_2$)$_2$, L$_2$ denoting 1,3-bis[bis(2-methoxyphenyl)phosphino]propane instead of 1,3-bis(diphenylphosphino)propane.

The initial polymerization rate was 6.5 kg copolymer/(g palladium.hour). After 1 hour, i.e. prior to the release of pressure, the polymerization rate was 5.0 kg copolymer/(g palladium.hour). The decay of the rate was 25%.

EXAMPLE 3

A copolymer of carbon monoxide with ethene and propene was prepared following the procedures outlined in Example 1, but with 0.025 mmoles L$_2$Pd(CH$_3$CO$_2$)$_2$, L$_2$ denoting 2-sila-2,2-dimethyl-1,3-bis[bis(2-methoxyphenyl)phosphino]propane instead of 1,3-bis(diphenylphosphino) propane.

The initial polymerization rate was 11.0 kg copolymer/(g palladium.hour). After 1 hour, i.e. prior to the release of pressure, the polymerization rate was 11.0 kg copolymer/(g palladium.hour). There was no decay in the rate of polymerization.

EXAMPLE 4

(For Comparison)

A copolymer of carbon monoxide with ethene and propene was prepared following the procedures outlined a Example 1, with the differences that the copolymerization was not terminated after 1 hour, and that after one hour additional L$_2$Pd(CH$_3$CO$_2$)$_2$ (0.028 g, 0.047 mmoles), wherein L$_2$ denotes 1,3-bis(diphenylphosphino)propane, dissolved in 20 ml dichloromethane was injected into the autoclave. At the moment of the injection of additional L$_2$Pd(CH$_3$CO$_2$)$_2$ the polymerization rate was 0.1 kg copolymer/(g palladium.hour).

During the hour subsequent to the injection of additional L$_2$Pd(CH$_3$CO$_2$)$_2$ no increase, but only a further decrease of the polymerization rate was detected.

We claim as our invention:

1. A process for preparing linear alternating polyketones comprising contacting carbon monoxide and an olefinically unsaturated compound in the presence of a liquid diluent with a catalyst composition comprising:

(a) a source of Group VIII metal;

(b) a bidentate ligand of the formula:
   R$^1$R$^2$M$^1$—R—M$^2$R$^3$R$^4$ wherein M$^1$ and M$^2$ independently represent a phosphorus, arsenic or antimony atom, each of R$^1$, R$^2$, R$^3$ and R$^4$ independently represents substituted or unsubstituted hydrocarbyl groups with the proviso that at least one of R$^1$, R$^2$, R$^3$ and R$^4$ is a polar substituted aryl group and R is a bivalent bridging group containing two to four carbon atoms in the bridge, and (c) a hydrocarbyl borane compound, and imparting a stirring mixture of at least 0.25 kW/m$^3$.

2. The process of claim 1 wherein said Group VIII metal is palladium and the boron hydrocarbyl compound is a hydrocarbylborane of the formula BXYZ wherein X, Y, and Z are independently substituted or unsubstituted hydrocarbyl groups.

3. The process of claim 2 wherein said hydrocarbyl groups are aryl groups.

4. The process of claim 2 wherein the molar ratio of boron to the Group VIII metal is less than 25.

5. The process of claim 1 wherein a portion of the total quantity of said boron hydrocarbyl compound is supplied to the process at the start of the process and a portion of the total quantity of boron hydrocarbyl compound is supplied to the process after the start of the process.

6. The process of claim 1 wherein R is a bridging group consisting of three atoms wherein the middle atom is a carbon or silicon atom carrying one or two substituents and the two outer atoms are carbon atoms.

7. The process of claim 6 wherein said middle atom is a carbon atom substituted with a member of the group consisting of hydroxy, alkyl, and aryl groups.

8. The process of claim 7 wherein said substituent is selected from the group consisting of 2,4,6-trimethylbenzyloxy, alkoxyalkyloxy, and hydroxyalkyl groups.

9. The process of claim 6 wherein the middle atom is silicon substituted with two alkyl groups.

10. The process of claim 1 carried out in the further presence of a protic compound selected from the group consisting of acids, alcohol, and water.

11. The process of claim 1 carried out in the further presence of a diluent selected from the group consisting of aromatic diluents and protic diluents.

12. The process of claim 1 wherein said olefinically unsaturated compound is ethene or a mixture of ethene and another alpha-olefin.

13. The process of claim 12 wherein said other alpha-olefin is propene or butene.

* * * * *